United States Patent [19]
Jain et al.

[11] Patent Number: 5,914,455
[45] Date of Patent: Jun. 22, 1999

[54] AIR PURIFICATION PROCESS

[75] Inventors: Ravi Jain, Bridgewater; James K. Tseng, Berkeley Heights, both of N.J.

[73] Assignee: The BOC Group, Inc., Murray Hill, N.J.

[21] Appl. No.: 08/940,408

[22] Filed: Sep. 30, 1997

[51] Int. Cl.⁶ .......................... B01D 53/047; B01D 53/26
[52] U.S. Cl. .................... 95/96; 95/106; 95/119; 95/122; 95/129; 95/139; 95/140; 95/143
[58] Field of Search ........................ 95/96–106, 117–119, 95/121, 122, 129, 139, 140, 143, 144

[56] References Cited

U.S. PATENT DOCUMENTS

| | | | |
|---|---|---|---|
| 2,918,140 | 12/1959 | Brooks | 95/98 |
| 4,054,428 | 10/1977 | Foltz | 95/105 |
| 4,249,915 | 2/1981 | Sircar et al. | 95/99 |
| 4,264,340 | 4/1981 | Sircar et al. | 95/99 |
| 4,472,178 | 9/1984 | Kumar et al. | 95/139 X |
| 4,702,749 | 10/1987 | Sircar et al. | 95/96 |
| 4,711,645 | 12/1987 | Kumar | 95/139 X |
| 4,770,676 | 9/1988 | Sircar et al. | 95/99 |
| 5,089,034 | 2/1992 | Markovs et al. | 95/139 X |
| 5,110,569 | 5/1992 | Jain | 95/97 X |
| 5,232,474 | 8/1993 | Jain | 95/97 |
| 5,268,023 | 12/1993 | Kirner | 95/103 |
| 5,451,248 | 9/1995 | Sadkowski et al. | 95/99 |
| 5,486,227 | 1/1996 | Kumar et al. | 95/99 X |
| 5,531,808 | 7/1996 | Ojo et al. | 95/139 X |
| 5,614,000 | 3/1997 | Kalbassi et al. | 95/139 X |
| 5,674,311 | 10/1997 | Notaro et al. | 95/96 |
| 5,728,198 | 3/1998 | Acharya et al. | 95/139 X |

*Primary Examiner*—Robert Spitzer
*Attorney, Agent, or Firm*—Coleman R. Reap; Salvatore P. Pace

[57] ABSTRACT

An air prepurification process which includes, as a first step, a pressure swing adsorption process in which the air is passed through a bed of adsorbent which contains activated alumina, thereby effecting removal of substantially all moisture and most carbon dioxide from the feed air and as a second step, a temperature swing adsorption process in which the dried feed air is passed through a bed of carbon dioxide-selective adsorbent, thereby removing substantially all of the carbon dioxide remaining in the feed air. The feed air may be passed through beds of hydrogen oxidation and carbon monoxide oxidation catalysts between the first and second steps to convert any hydrogen and carbon monoxide in the feed air to water vapor and carbon dioxide, respectively, these components being removed from the feed air during the second step. The feed air may be optionally passed through a layer of a hydrocarbon selective adsorbent between the first and second steps to remove hydrocarbons such as ethylene, propylene and propane.

22 Claims, 1 Drawing Sheet

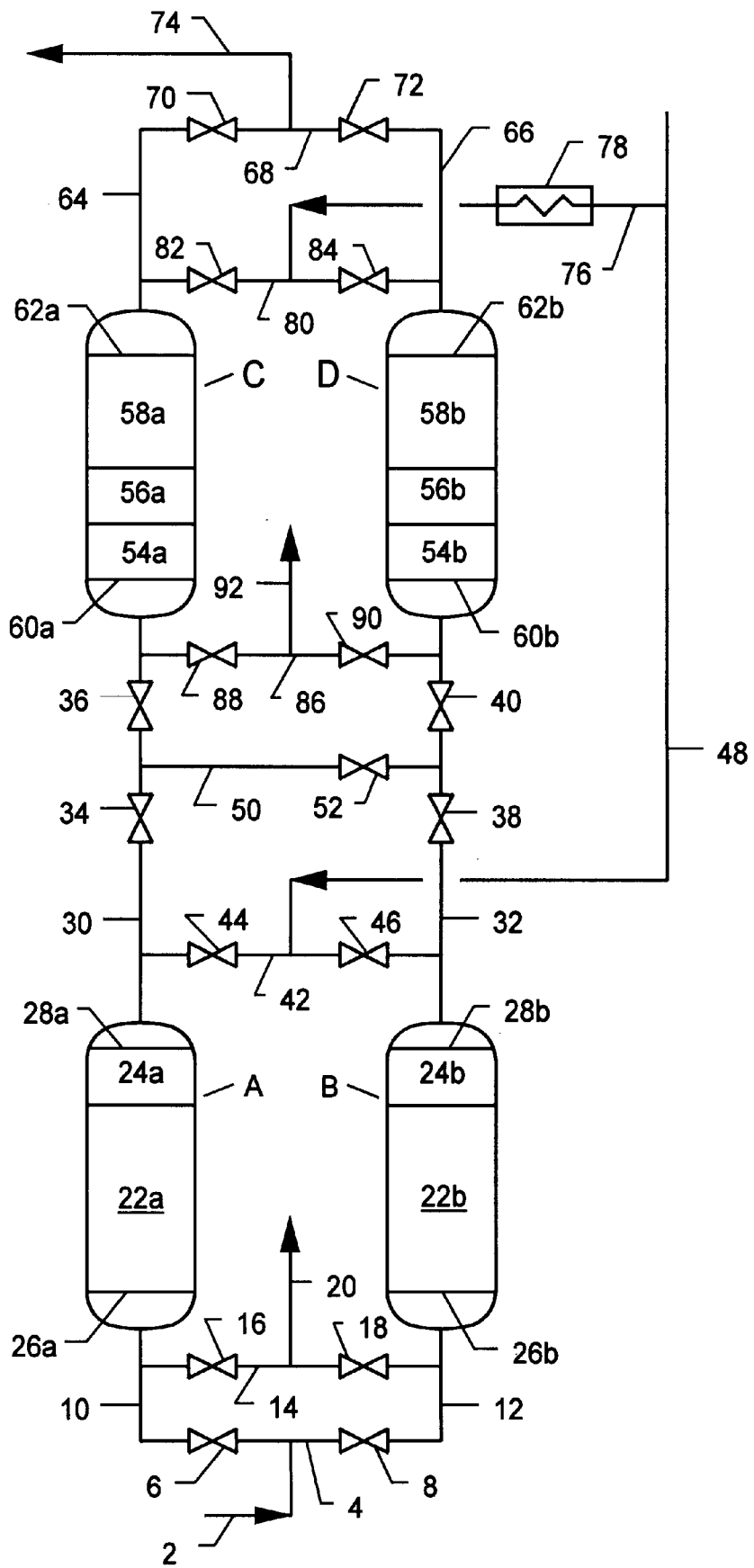

AIR PURIFICATION PROCESS

FIELD OF THE INVENTION

This invention relates to the purification of gas streams and more particularly to the removal of carbon dioxide and water vapor from gas streams by adsorption. Specifically, the invention relates to the purification of air by the removal of water vapor, carbon dioxide, carbon monoxide, hydrogen and hydrocarbons therefrom by a combination of pressure swing adsorption (PSA) and temperature swing adsorption (TSA).

BACKGROUND OF THE INVENTION

In many industrial processes using a gaseous feed stream is it is desirable or necessary to remove carbon dioxide from the gaseous feed stream prior to certain steps of the process. For example, in the separation of atmospheric air into its component parts by cryogenic distillation, it is necessary to prepurify the air by removal of carbon dioxide and water vapor from the air feed prior to refrigerating the air; otherwise, these gases would condense and freeze in the refrigeration heat exchange equipment and eventually clog the equipment, thereby necessitating removal of the equipment from service for removal of the frozen carbon dioxide and ice. The carbon dioxide and water vapor can be removed from the air by a number of techniques.

One well known method of removing carbon dioxide and water removal from gas streams is by the use of pairs of reversing heat exchangers that are operated alternately, such that one heat exchanger is in purification service while the other is undergoing frozen carbon dioxide and ice removal. Specifically, in this method the gas feed is passed through one heat exchanger in exchange with a refrigerant, which causes the carbon dioxide and water vapor to freeze onto the surfaces of the heat exchanger. When the buildup of frozen carbon dioxide and ice in the heat exchanger reaches a certain level, the heat exchanger is taken out of service to remove, by melting, the frozen carbon dioxide and ice. The other heat exchanger of the pair, from which frozen carbon dioxide and ice have been removed, is then placed into purification service. This method has the disadvantage that a considerable amount of regeneration gas is required to melt the frozen carbon dioxide and ice.

A popular method of removing carbon dioxide and water vapor from gas streams is adsorption. One common adsorption method use for air prepurification is PSA using two serially-connected adsorption beds, the first bed containing a desiccant, such as silica gel or activated alumina for water vapor removal, and the second bed containing a carbon dioxide-selective adsorbent, such as sodium-exchanged type X zeolite (13X zeolite). A two layer air prepurification system comprising a first bed of adsorbent selective for the removal of water from an air stream, for example alumina or silica gel, and a second bed of adsorbent selective for the removal of carbon dioxide, for example, 5A, 13X, calcium X or sodium mordenite, is disclosed in U.S. Pat. No. 4,711,645. Other two layer air prepurification PSA processes are described in U.S. Pat. Nos. 5,110,569 and 5,156,657, the disclosures of which are incorporated herein by reference. This method has a number of disadvantages. It is difficult to desorb carbon dioxide from the 13X zeolite, the zeolite develops "cold spots" in the upstream region of the bed of adsorbent and the adsorbent loses some of its adsorption capacity with time. TSA has also been practiced using this combination of beds. U.S. Pat. No. 5,110,569, mentioned above, shows such a process. A major disadvantage of the described TSA process is that a great quantity of heat energy is required in the adsorbent regeneration step, since both beds must be heated sufficiently to drive off the adsorbed moisture and carbon dioxide.

U.S. Pat. Nos. 4,249,915 and 4,472,178 disclose a two-step adsorption process for removing water vapor and carbon dioxide from atmospheric air comprising a first step in which water vapor is removed from the air by PSA using an adsorbent such as alumina, silica gel, 13X zeolite or 5A zeolite and a second step in which carbon dioxide is removed from the air by TSA using an adsorbent selective for carbon dioxide, such as 13X zeolite or 5A zeolite.

Air prepurification by PSA has also been practiced using a single bed of adsorbent which removes both water vapor and carbon dioxide. Such a process is disclosed in U.S. Pat. No. 5,232,474, the disclosure of which is incorporated herein by reference. The principal disadvantages of this method of air prepurification is that it is difficult to produce ultra high purity air (air containing less than 1 ppm carbon dioxide) efficiently by this method, and a high volume of purge gas is required to effect adequate adsorbent regeneration.

Methods of producing air containing very low levels of water vapor, carbon dioxide, carbon monoxide, hydrogen and hydrocarbons are continuously sought. The present invention provides a method which accomplishes this, and does so with low energy and capital expenditures

SUMMARY OF THE INVENTION

This invention uses a combination of PSA and TSA to remove carbon dioxide (and any water vapor present) from a gas stream. Optionally, carbon monoxide, hydrogen and hydrocarbons are also removed. The PSA step, which precedes the TSA step, uses a bed of adsorbent primarily comprising activated alumina or an activated alumina/zeolite composite or both. This layer removes any water vapor contained in the gas and at least 75 volume percent of the carbon dioxide contained in the gas. Optionally, hydrocarbons such as propane, propylene and ethylene are removed in the PSA step using a second layer of adsorbent. The second step is the TSA step and it is practiced using a bed of adsorbent which effectively removes substantially all carbon dioxide remaining in the gas stream following the first step. Optionally, carbon monoxide and hydrogen are removed in the second step using catalysts and adsorbents.

The broad embodiment of the invention comprises a method of removing carbon dioxide from a gas comprising repeatedly performing the steps:

(a) subjecting said gas to a cyclic PSA process comprising an adsorption step and an adsorbent regeneration step carried out in a first adsorption zone containing a sufficient quantity of adsorbent to adsorb at least 75 volume percent of the carbon dioxide contained in the gas; and producing a carbon dioxide-depleted nonadsorbed gas stream; and (b) subjecting the carbon dioxide depleted nonadsorbed gas stream to a cyclic TSA process comprising an adsorption step and an adsorbent regeneration step carried out in a second adsorption zone containing an adsorbent which is highly selective for carbon dioxide at low carbon dioxide partial pressures, thereby producing a substantially carbon dioxide-free gas stream.

In general, the absolute pressure in the first adsorption zone during the adsorption step of the PSA process is in the range of about 1.5 to about 30 bar (bar, absolute), and this pressure is preferably in the range of about 3 to about 20 bar.

The pressure in the first adsorption zone during said adsorbent regeneration step of said pressure swing adsorption process is generally reduced to about 0.15 to about 3 bara and more frequently it is reduced to values in the range of about 0.3 to about 2 bara.

The temperature in each of the first and second adsorption zones during the adsorption steps is generally maintained in the range of about 0 to about 60° C., and often it is kept in the range of about 5 to about 50° C. The temperature in the second adsorption zone during the regeneration step of the TSA process is generally increased to about 50 to about 300° C., and often the temperature in this bed during this period is increased to about 100 to about 250° C. After the heating step, TSA bed would be normally cooled to an adsorption temperature.

The duration of the cycle of the pressure swing adsorption process is generally in the range of about 6 to about 60 minutes, and is preferably in the range of about 12 to about 30 minutes, and the duration of the cycle of said temperature swing adsorption process is generally in the range of about 2 to about 16 hours, and preferably in the range of about 4 to about 8 hours.

The process of the invention is preferably carried out in a system comprising one or more pairs of first adsorption zones and one or more pairs of second adsorption zones, and wherein the adsorption zones of each pair of first adsorption zones are operated 180° out of phase, such that when one first adsorption zone of a pair of first adsorption zones is in adsorption service the other first adsorption zone of that pair is undergoing adsorbent regeneration, and the second adsorption zones of each pair of second adsorption zones are operated 180° out of phase, such that when one second adsorption zone of a pair of second adsorption zones is in adsorption service the other second adsorption zone of that pair is undergoing adsorbent regeneration.

The method of the invention is particularly suitable for the prepurification of air, particularly air that is used as the feed to a cryogenic distillation process in which the air is separated into a nitrogen-enriched product and an oxygen-enriched product.

In preferred embodiments of this aspect of the invention the adsorbent in the one or both of the first and second adsorption zones is purged with a waste gas stream from the cryogenic distillation process during at least part of the adsorbent regeneration step of the PSA and TSA processes.

In cases where the gas being treated contains hydrocarbons as an impurity the process preferably includes between steps (a) and (b) the additional step of contacting the effluent from step (a) with a hydrocarbon selective adsorbent.

In a preferred embodiment, the adsorbent in the first adsorbent zone is activated alumina or activated alumina/zeolite composite.

In a preferred embodiment of the invention, particularly when used to separate air, the adsorbent used in step (b) is selected from low silicon sodium X zeolite (NaLSX), alkali-washed activated alumina and mixtures of these. In a more preferred embodiment, the adsorbent used in step (b) is sodium type LSX zeolite.

In another embodiment of the invention any hydrogen present in the feed gas as an impurity is removed therefrom by incorporating into the process between steps (a) and (b) the additional step of contacting the effluent from step (a) with a hydrogen oxidation catalyst, thereby converting said hydrogen to water vapor. In another embodiment any carbon monoxide present in the feed gas as an impurity is removed therefrom by incorporating into the process between steps (a) and (b) the additional step of contacting the effluent from step (a) with a carbon monoxide catalyst, thereby converting said hydrogen to water vapor. When both hydrogen and carbon monoxide are present in the feed gas these can be removed by incorporating into the process between steps (a) and (b) the additional steps of contacting the effluent from step (a) with a hydrogen oxidation catalyst and with a carbon monoxide oxidation catalyst, thereby converting the hydrogen to water vapor and the carbon monoxide to carbon dioxide. In yet another embodiment hydrocarbons such as ethylene, propylene and propane present in the feed gas as an impurity are removed therefrom by incorporating into the process between steps (a) and (b) the additional step of contacting the effluent from step (a) with hydrocarbon selective adsorbent such as activated carbon and 5A zeolite.

BRIEF DESCRIPTION OF THE DRAWING

The drawing FIGURE is a schematic representation of a system in which a preferred embodiment of the invention is carried out. Valves, lines and equipment that are not necessary for an understanding of the invention have not been included in the drawing.

DETAILED DESCRIPTION OF THE INVENTION

PSA and TSA are well known processes for separating the components of a mixture of gases by virtue of the difference in the degree of adsorption among them on a particulate adsorbent. Typically, these processes are carried out in one or more beds which are operated in a cycle which includes an adsorption step and a bed regeneration step. The processes are often carried out in pairs of adsorbent beds arranged in parallel and cycled 180° out of phase, such that one bed is in the adsorption mode while the other bed is undergoing bed regeneration. This provides a pseudo continuous flow of the desired product or products, which may be obtained during either or both phases of the process. In PSA, the adsorption step may be carried out at atmospheric pressure, but is generally carried out at superatmospheric pressure, and the desorption or bed regeneration step is carried out at a relatively low pressure or under a vacuum. The PSA cycle may contain other steps in addition to the fundamental steps of adsorption and regeneration, such as pressure equalization between a bed which has just completed its adsorption step and another bed which has just completed its bed regeneration step, and partial repressurization with product gas following bed regeneration or bed equalization. In a TSA process, the adsorption step is usually conducted at a low temperature and the desorption or bed regeneration step is conducted by heating the adsorbent to a high temperature. Bed regeneration may be accomplished by heating the adsorbent with a heating device, by passing through the adsorbent a heated gas which is substantially free of the component to be desorbed from the adsorbent, or by combinations of these procedures.

As used herein to describe the condition of a gas stream, the terms "substantially water vapor-free" or "substantially free of water vapor" mean that the gas stream contains not more than about 1 ppm water vapor. Similarly, the terms "substantially carbon dioxide-free" or "substantially free of carbon dioxide" mean that the gas stream being described contains not more than about 1 ppm carbon dioxide. When "substantially all" of the water vapor and/or "substantially all" of the carbon dioxide are removed from a gas, the gas is substantially free of water vapor and/or substantially free of carbon dioxide.

The invention will be described as it applies to the prepurification of air by the removal of water vapor and carbon dioxide and, optionally, hydrocarbons, hydrogen and carbon monoxide therefrom, however it is to be understood that the process can be used for the purification of any gas by the removal of carbon dioxide therefrom where the carbon dioxide is more strongly adsorbed than the gas to be purified. The invention can be best understood upon consideration of the appended drawing, which shows a system comprising a first pair of adsorption vessels, A and B, arranged in parallel and a second pair of adsorption vessels, C and D, also arranged in parallel, vessels C and D being in series relationship with respect to vessels A and B.

In the drawing, line 2 is connected to a source of air. At a point upstream of the system illustrated in the drawing, line 2 may be provided with a compressor and a cooler and moisture condenser (not shown). Line 2 is connected to manifold 4, which is provided with valves 6 and 8, which, control flow of feed gas into vessels A and B through feed lines 10 and 12, respectively. Exhaust manifold 14 is also connected to lines 10 and 12 via valves 16 and 18, respectively. Adsorbed gas discharge line 20 is also connected to manifold 14. Line 20 may vent directly to the atmosphere or it may be connected to the inlet end of a vacuum pump (not shown).

Vessels A and B each have first adsorbent layers 22a and 22b, which contain activated alumina or activated alumina/zeolite composite. Layers 22a and 22b are sufficiently large to remove all of any water vapor and at least 75% of the carbon dioxide contained in the gas stream being treated. Layers 22a and 22b are preferably large enough to reduce the carbon dioxide content of the gas stream to not more than about 10 ppm, and most preferably large enough to reduce the carbon dioxide content to not more than about 5 ppm.

Positioned in vessels A and B, above layers 22a and 22b, when present, are optional layers 24a and 24b, respectively. Layers 24a and 24b comprise a hydrocarbon selective adsorbent, for example 5A zeolite or activated carbon and are used for removing hydrocarbons such as ethylene, propylene and propane. In the embodiment illustrated in the drawing, vessels A and B are provided with support screens 26a and 26b and top screens 28a and 28b. Screens 26a and 26b are displaced from the bottom of vessel A to provide even distribution of the feed gas entering vessels A and B. Gas collection spaces are provided in vessels A and B above screens 28a and 28b. The outlet ends of vessels A and B are connected to lines 30 and 32, which are respectively provided with valves 34 and 36, and valves 38 and 40. Purge gas manifold 42, fitted with valves 44 and 46, is connected to lines 30 and 32. Between valves 44 and 46, manifold 42 is connected to purge gas supply line 48, which is connected to a source of purge gas, such as a waste gas stream from a downstream cryogenic distillation unit. Cross-connection line 50, provided with valve 52, joins lines 30 and 32 between valves 34 and 36 and between valves 38 and 40.

At their downstream ends, lines 30 and 32 are connected to the inlet ends of vessels C and D, respectively. Vessels C and D Optionally contain carbon monoxide oxidation catalyst layers 54a and 54b, which are shown positioned near the inlet ends of the vessels. The carbon monoxide oxidizing agent may be, for example, a metal oxide such as nickel oxide, copper oxide, manganese dioxide and mixtures of these. The metal oxide may be supported on a porous substrate. The preferred metal oxide catalyst is a mixture of copper oxide and manganese dioxide. Vessels C and D may optionally contain hydrogen oxidation catalyst layers 56a and 56b. These catalysts may be noble metal-based materials, such as palladium or platinum, and they may be mounted on an inert support, such as alumina. Layers 54a and 54b may be upstream or downstream of hydrogen oxidation layers 56a and 56b, or the two catalysts can be combined as a single mixed layer, if desired.

Also contained in vessels C and D, downstream of carbon monoxide and hydrogen oxidation catalyst layers 54a, 54b, 56a and 56b (when these are present), are layers 58a and 58b, which comprise carbon dioxide-selective adsorbent having high selectivity for carbon dioxide, even at very low concentrations of carbon dioxide. These adsorbent layers are intended to adsorb any carbon dioxide that passes through the activated alumina layer in vessels A and B and any carbon dioxide and water vapor produced by oxidation of carbon monoxide and hydrogen in optional layers 54a, 54b, 56a and 56b. Suitable carbon dioxide-selective adsorbents include sodium-exchanged LSX zeolite i.e. Sodium-exchanged type X zeolite having a silicon-to-aluminum atomic ratio in the range of about 0.95 to about 1.25, and preferably in the range of about 0.95 to about 1.05, and especially about 1, and alkali-washed activated aluminas, such as activated aluminas sold by Alcoa Chemical under the trademark selexsorb® COS. The preferred carbon dioxide adsorbent is sodium-exchanged LSX. Vessels C and D may also contain support screens 60a and 60b and upper screens 62a and 62b, whose functions are the same as the functions of screens 26a, 26b, 28a and 28b, described above.

Vessels C and D may be independent vessels, as illustrated in the drawing, or they may be combined into a single vessel, with vessel C housed in an upper compartment and vessel D in a lower compartment, or vice versa. Furthermore, it is not necessary that the adsorbent beds in vessels C and D be identical or that the TSA cycle be symmetrical. Vessel C may be the main adsorber and contain a large bed of adsorbent and have a long adsorption step, with vessel D being an auxiliary adsorber and containing a relatively small bed of adsorbent and being operated with a short adsorption cycle.

Connected to the outlet ends of vessels C and D are product lines 64 and 66, which, on their downstream ends are connected to product gas manifold 68. Valves 70 and 72 control flow of product gas from lines 64 and 66, respectively to product line 74, which joins manifold 68 between valves 70 and 72. Product line 74 may be connected to a cryogenic distillation unit or other air separation equipment (not shown), or to an end use application.

Purge gas supply line 76, equipped with heater 78, provides purge gas from line 48 to manifold 80. Flow from line 76 to lines 64 and 66 is controlled by valves 82 and 84, respectively. Purge vent manifold 86 Connects lines 30 and 32 to purge vent 92 via valves 88 and 90, respectively.

The adsorbent in vessels A and B serve to remove substantially all of the moisture and a considerable portion of the carbon dioxide that is contained in the gas being treated, and the adsorbent in vessels C and D serve to remove all remaining carbon dioxide, including carbon dioxide produced by the catalytic oxidation of carbon monoxide in beds C and D. The adsorbent in vessels C and D also serve to remove any moisture produced by the oxidation of hydrogen in the upstream end of vessels C and D. It is important to remove all free moisture contained in the gas in the PSA stage of the process to permit the use of a small bed of highly efficient carbon dioxide-selective adsorbent in the TSA stage of the process. It is even more important to remove substantially all moisture from the gas being treated when the second stage contains hydrogen and/or carbon monoxide oxidation layers, because moisture causes degradation of the catalysts.

Operation of the system will be described with vessels A and B containing a first layer of activated alumina and a second layer of activated carbon and with vessels C and D containing a first layer of a CO oxidation catalyst such Carus-300 from Carus Chemical CO., a second layer of palladium-coated alumina and a third layer of a sodium LSX zeolite. The PSA stage, carried out in vessels A and B, operates independently of the TSA stage, carried out in vessels C and D. The duration of each cycle of the PSA stage is, at most, several minutes, while the duration of a cycle of the TSA stage is several hours. Accordingly, during each half-cycle of the TSA process, vessels A and B will undergo many cycles in the adsorption mode in series with vessel C while it is in the adsorption mode and then will undergo many cycles in the adsorption mode in series with vessel D while it is in the adsorption mode.

The PSA process will be carried out with pressurization to superatmospheric pressure during the adsorption step and reduction of pressure to atmospheric pressure during the bed regeneration step. Pressurization and depressurization during each half-cycle of the PSA process can be limited to vessels A and B, or it can include the one of vessels C and D that is currently in the adsorption mode. Furthermore, the vessel of the TSA stage that is in the adsorption mode can be pressurized and depressurized with each half-cycle of the PSA process, or it can be pressurized at the beginning of each half-cycle of the TSA process and remain pressurized during the entire half-cycle of the TSA process. The process will he described with the TSA vessel in adsorption service remaining pressurized during the entire half-cycle of the TSA cycle while vessels A and B are alternately pressurized and depressurized during each cycle of the PSA process. This is accomplished by isolating the PSA section from the TSA section at the end of each half-cycle.

In the following description, vessels A and C will be initially in the adsorption mode and vessels B and D initially in the bed regeneration mode. During the first phase of the process, valves 6, 18, 34, 36, 46, 84 and 90 are open and all other valves are closed. Atmospheric air is compressed and cooled and introduced into vessel A through lines 2 and 10. When the pressure in vessels A and C reach the desired adsorption pressure, valve 70 is opened and gas flow,s through vessels A and C at the adsorption pressure. As the feed air passes concurrently (in the direction from the feed entrance towards the nonadsorbed gas outlet of the vessels) through layer 22a, substantially all water vapor (if the air contains any) and at least 75 volume % of the carbon dioxide contained in the air are adsorbed. The dried air passes out of layer 22a substantially free of water vapor and containing a small amount of carbon dioxide and next passes through optional layer 24, which removes hydrocarbons from the air, if any are present. The partially purified air leaves vessel A through the nonadsorbed gas outlet and then passes through line 30 and into vessel C. In vessel C, the gas passes through layers 54a and 56a, when these are present in vessel C and, as it does so, any carbon monoxide and hydrogen that is present in the air is oxidized to carbon dioxide and water. The air then passes, through the layer of sodium LSX, layer 58a, which removes all water vapor generated in layer 56a and all carbon dioxide remaining in the gas. The purified air, now substantially free of hydrogen, hydrocarbons, water vapor, carbon monoxide and carbon dioxide, passes out of vessel C through line 64 and leaves the system through line 74.

Meanwhile, regeneration gas that is free of the above-mentioned impurities enters the system through line 48. As noted above the regeneration gas may be a waste stream from a downstream cryogenic distillation unit or other air separation equipment. Part of the regeneration gas flows through manifold 42 and line 32, and then flows counter currently (in the direction opposite to the flow of feed gas through the vessels) through the layers of adsorbent in vessel B. As it passes through layer 24b it desorbs hydrocarbons contained in this layer. The gas then flows through layer 22B, where it desorbs water vapor and carbon dioxide from the alumina adsorbent. The purge gas, together with the gas components desorbed from the adsorbents in vessel B, pass out of vessel B and leave the system through line 20.

The remainder of the purge gas entering the system through line 48 flows through line 76, is heated in heater 78 and then flows counter currently through the adsorption layers in vessel D. As it passes through layer 58b the regeneration gas desorbs carbon dioxide and water vapor from the adsorbent and any chemisorbed impurities from the catalyst layers. The regeneration gas, together with the desorbed carbon dioxide and water vapor, leaves vessel D through line 32 and exits the system through line 92.

As the PSA adsorption step proceeds the adsorption front in layer 22a advances toward the outlet end of vessel A. When it reaches a predetermined point in layer 22a, the first phase of the PSA cycle is terminated and the second phase is started. During the second phase vessel B, which has completed its adsorbent regeneration phase, is put into adsorption service and the adsorbents in vessel A are regenerated. The changeover is accomplished by opening valves 8, 16, 38, 44 and 52. Valves 36, 70, 84 and 90 remain open, and all other valves are closed. Feed air now passes concurrently through layer 22b, where substantially all water vapor in the air and at least 75 volume % of the carbon dioxide contained in the air are adsorbed. The dried air passes out of layer 22b and passes through layer 24, which removes hydrocarbons therefrom. The partially purified air leaves vessel B through the nonadsorbed gas outlet, passes through lines 32 and 50 and the upper part of line 30 and enters vessel C. The gas passes through vessel C, which remains in adsorption service. The purified air, now substantially free of hydrogen, hydrocarbons, water vapor, carbon monoxide and carbon dioxide, passes out of vessel C through line 64 and leaves the system through line 74, as in the first phase of the process. Also during this phase, regeneration gas flows through line 48, manifold 42 and line 30 and counter currently through the layers of adsorbent in vessel A, whereupon it desorbs hydrocarbons from layer 24a and water vapor and carbon dioxide from layer 22a. The purge gas, together with the gas components desorbed from vessel A, pass out of vessel A through line 10 and leave the system through line 20.

During the second phase of the process regeneration of vessel D is continued with the flow of heated regeneration gas counter currently therethrough, as described above.

At an appropriate time this is followed his passing an unheated purge gas through Bed B to cool it to close to adsorption temperature.

As the second phase of the PSA process proceeds, the adsorption front in layer 22b advances toward the outlet end of this vessel. When it reaches the predetermined endpoint in layer 22b, the second phase of the PSA cycle is terminated. The PSA cycle is continuously repeated.

While the PSA process continues, with vessels A and B repeatedly alternating in adsorption and regeneration phases, the first phase of the TSA process carried out in vessels C and D proceeds. Gradually the adsorption front in layer 58a advances toward the outlet end of vessel C. When it reaches the desired endpoint, the first phase of the TSA process is terminated and the second phase initiated. This is accomplished by opening valves 40, 72. 82 and 88, and closing valves 36, 70, 84 and 90. Feed gas exiting vessels A and B through their nonadsorbed gas outlet ends now passes concurrently through vessel D for the second stage of the purification procedure, and the purified gas is passed out of the system through lines 66, 68 and 74; while adsorbent layer 58 is regenerated by passing heated purge gas counter currently therethrough via lines 76, 80, the lower part of line 64, the upper part of line 30 and vent line 92. This half-cycle of the TSA process continues until the adsorption front in layer 58b reaches the desired end point. The half-cycle is terminated by the procedure described above, and a new cycle is begun with vessel C is adsorption service and the adsorbent in vessel D undergoing regeneration. The process continues with alternation of vessels A and B in the PSA cycle and alternation of vessels C and D in the TSA cycle.

As indicated above, the invention is suitable for removing substantially all carbon dioxide from gas streams containing more than 10 ppm carbon dioxide. It is ideally suited to remove carbon dioxide from gas streams containing up to about 1000 ppm carbon dioxide, and is especially useful for removing carbon dioxide from atmospheric air, which generally contains about 250 to about 400 ppm carbon dioxide. The first layer removes at least 75%, and preferably at least about 90% by volume of the carbon dioxide from the gas being treated. In the most preferred embodiment the first layer reduces the carbon dioxide content of the gas being treated to not more than about 10 ppm, and the second layer of adsorbent, the carbon dioxide-selective zeolite, reduces the carbon dioxide content of the gas to not more than about 1 ppm, and preferably to not more than about 100 ppb. The first layer will, of course, remove substantially all water vapor from the gas.

A typical PSA cycle used by the first set of beds is as follows:

TABLE I

Typical PSA cycle for the first set of beds

| | |
|---|---|
| Bed pressurization | 3 minutes |
| Purification | 12 minutes |
| Depressurization | 0.5 minutes |
| Regeneration by purge | 8.5 minutes |

A typical TSA cycle for the TSA beds is as follows:

TABLE II

Typical TSA cycle for the second set of beds

| | |
|---|---|
| Purification | 8 hours |
| Bed heating | 2.5 hours |
| Bed cooling | 5.0 hours |
| Bed pressurization | 0.5 hours |

It will be appreciated that it is within the scope of the present invention to utilize conventional equipment to monitor and automatically regulate the flow of gases within the system so that it can be fully automatically to run continuously in an efficient manner.

The invention is further illustrated by the following example in which, unless otherwise indicated, parts, percentages and ratios are on a volume basis.

EXAMPLE 1

Experiments were carried out with a PSA PPU unit containing two identical 5.24" beds and a bed height of 62".

The beds were loaded with LaRoche A-201 AA (7×12 mesh) and PSA experiments were run with a feed air containing 350–400 ppm $CO_2$ at 65 psig, 14 Std. cubic ft per min (SCFM) and 40° C. The standard conditions refer to 70° F. and 1 atm. The regeneration also carried out with $CO_2$-free nitrogen. The average amount of regeneration flow was 47% of feed flow. A half-cycle time of 12 minutes was used. After the product $CO_2$ concentration reached the steady state, $CO_2$ concentration profiles were measured and the sieve specific products for various $CO_2$ concentrations in the product were determined. The sieve specific products are:

Sieve specific product for 10 ppm $CO_2$ in product=19.4 SCFM/ft$^3$ sieve

Sieve specific product for 1.0 ppm $CO_2$ in product=15.9 SCFM/ft$^3$ sieve

Sieve specific product for 3 ppb $CO_2$ in product=8.0 SCFM/ft$^3$ sieve

This example illustrates that the bed size of the PSA beds can be reduced to about 40% if the product $CO_2$ contains 10 ppm carbon dioxide compared to the case where the product $CO_2$ contains 3 ppb $CO_2$.

EXAMPLE 2

This example illustrates that the height of the $CO_2$ adsorbent layer in the second set of beds can be reduced significantly (reducing the cost and regeneration requirements for this layer) by using an adsorbent with high $CO_2$ capacity at a very low $CO_2$ partial pressure. Experiment were run with 10 ppm $CO_2$ in nitrogen at a pressure of 35 psig, a temperature of 35° C. and a flow rate of 100 SCFH. The conditions are similar to those expected at the outlet of the first set of PSA beds. The bed diameter was 1.625" and the bed length was 18". $CO_2$ capacities for various adsorbents for these conditions are listed below.

| Adsorbent | $CO_2$ Capacity, wt % |
|---|---|
| UOP 4A zeolite (8 × 12 mesh) | 0.14 |
| UOP 13x zeolite (8 × 12 mesh) | 0.20 |
| 13x zeolite with Si/Al = 1.25 (8 × 12 mesh), NaMSX | 0.65 |
| 13x zeolite with Si/Al = 1.0 (8 × 12 mesh), NaLSX | 1.00 |
| Alkali-washed AA (7 × 14 mesh), Alcoa Selexsorb ® COS | 1.20 |

The last three adsorbents are the preferred adsorbents for the carbon dioxide layer of this invention.

EXAMPLE 3

Experiments were carried out using a thermally regenerated bed (with impurity free nitrogen at 200° C.) containing 5 lbs of (Carulite-300 (from Carus Chemical), 5 lbs of 0.5%-Pd-on-AA (from Engelhard Corn) and 5 lbs of NaLSX adsorbent. This configuration represents the TSA beds of this invention. A bed with a cross-sectional area of 0.1 ft$^2$ was used. Air, at a flow rate of 20 SCFM, a temperature of 40° C. and a pressure of 125 psig was passed through this bed for 6 hours. The feed contained 10 ppm $CO_2$, about 1 ppm CO and about 1 ppm $H_2$. The product from this bed was continuously monitored. During the entire production time, the product contained less than 5 ppb each of $CO_2$, CO, $H_2$ and $H_2O$.

This example illustrates that removal of impurities to very low levels is possible by this invention.

EXAMPLE 3

In this example, various PSA, TSA and PSA/TSA designs of prior art are compared to the TSA/TSA design of this invention.

The conditions are:

Feed flow=12.100 SCFM

Feed pressure=65 psig

Feed temperature=35° C.

Power to compress feed air=2240 KW

The aim of the process is to produce air containing less than 3 ppb each of $CO_2$ and $H_2O$. Case 1 corresponds to PSA PPU Process with activated alumina (AA) such as the one discussed in U.S. Pat. No. 5,232,474. Case 2 corresponds to the standard TSA process where AA is used for water removal and 13X zeolite is used for $CO_2$ removal. Case 3 corresponds to U.S. Pat. No. 4,249,915 where PSA is used for water removal by adsorbents such as AA and TSA is used for $CO_2$ removal by 13X zeolite. Case 4 corresponds to this invention. In Case 4, PSA is used for removing water to less than 3 ppb and $CO_2$ to 10 ppm, remaining $CO_2$ is removed by TSA using NaLSX zeolite. In all cases, PSA cycle in Table I and TSA cycle in Table II is used. For TSA designs, mass transfer zone is added to the equilibrium zone.

TABLE III

Comparison of PSA, TSA and PSA/TSA designs for water and $CO_2$ removal

|  | Adsorbent amount for PSA lbs | Adsorbent amount for TSA, lbs | Air loss, % of feed air | Power equiv. of air loss, KW | Power for TSA regen., KW |
|---|---|---|---|---|---|
| Case 1: PSA with Activated alumina for water and $CO_2$ removal | 72,600 | — | 3.5 | 78.4 | — |
| Case 2: TSA with AA for $H_2O$ removal and 13x zeolite for $CO_2$ removal | — | 72,980 | 0.5 | 11.2 | 231.8 |
| Case 3: PSA for $H_2O$ removal with AA and TSA for $CO_2$ removal with 13x zeolite | 18,150 | 39,820 | 1.28 | 28.7 | 55.0 |
| Case 4: PSA with AA for $H_2O$ removal and $CO_2$ removal to 10 ppm, TSA for 10 ppm $CO_2$ removal with NaLSX | 29,940 | 5,000 | 1.50 | 33.6 | 6.0 |

Comparison of the various cases indicates that the total amount of adsorbent needed and power consumption (columns 5+6) is minimum for the process of this invention. Compared to Case 3 corresponding to U.S. Pat. No. 4,249,915, this invention requires 27% less adsorbent and 53% less power.

Although the invention has been described with particular reference to specific equipment arrangements and to specific experiments, these features are merely exemplary of the invention and variations are contemplated. For example, The PSA section of the system may contain a single adsorption vessel or it may contain three or more adsorption vessels arranged in parallel and operated in sequence. Furthermore the beds of the PSA section can be operated in a vacuum swing adsorption (VSA) cycle with adsorption carried out at or above atmospheric pressure and bed regeneration conducted under a vacuum, with or without a purge. The scope of the invention is limited only by the breadth of the appended claims.

What is claimed is:

1. A method of removing water vapor and carbon dioxide from a gas comprising repeatedly performing the steps:

(a) subjecting said gas to a cyclic pressure swing adsorption process comprising an adsorption step and an adsorbent regeneration step carried out in a first adsorption zone containing sufficient adsorbent to adsorb at least 75 volume percent of the carbon dioxide contained in the gas, thereby removing substantially all of the water vapor and at least 75 volume percent of the carbon dioxide from said gas; and (b) subjecting the substantially water vapor-free and carbon dioxide depleted nonadsorbed gas to a cyclic temperature swing adsorption process comprising an adsorption step and an adsorbent regeneration step carried out in a second adsorption zone containing a carbon dioxide-selective adsorbent, thereby producing a substantially water vapor- carbon dioxide-free gas stream.

2. The method of claim 1, wherein the pressure in said first adsorption zone during said adsorption step of said pressure swing adsorption process is in the range of about 1.5 to about 30 bara.

3. The method of claim 1 or claim 2, wherein the pressure in said first adsorption zone during said adsorbent regeneration step of said pressure swing adsorption process is reduced to about 0.15 to about 2 bara.

4. The method of claim 1, wherein the temperature in said first and second adsorption zones during said adsorption steps is in the range of about 0 to about 60° C.

5. The method of claim 1 or claim 4, wherein the temperature in said second adsorption zone during said adsorbent regeneration step of said temperature swing adsorption process is increased to about 50 to about 300° C.

6. The method of claim 1, wherein the duration of the cycle of said pressure swing adsorption process is in the range of about 6 to about 60 minutes.

7. The method of claim 1 or claim 6, wherein the duration of the cycle of said temperature swing adsorption process is in the range of about 2 to about 16 hours.

8. The process of claim 1 carried out in a system comprising one or more pairs of first adsorption zones and one or more pairs of second adsorption zones, and wherein the adsorption zones of each pair of first adsorption zones are operated 180° out of phase, such that when one first adsorption zone of a pair of first adsorption zones is in adsorption service the other first adsorption zone of that pair is undergoing adsorbent regeneration, and the second adsorption zones of each pair of second adsorption zones are operated 180° out of phase, such that when one second adsorption zone of a pair of second adsorption zones is in adsorption service the other second adsorption zone of that pair is undergoing adsorbent regeneration.

9. The method of claim 8, wherein said gas is atmospheric air.

10. The method of claim 9, wherein the adsorbent used in step (b) is selected from sodium LSX zeolite, alkali-washed alumina and mixtures of these.

11. The method of claim 10, wherein the adsorbent used in step (b) is sodium type LSX zeolite.

12. The method of claim 9, further comprising subjecting the substantially water vapor-free and carbon dioxide-free air to a cryogenic distillation process, thereby producing one or both of a nitrogen-enriched product and an oxygen-enriched product.

13. The method of claim 12, further comprising purging the adsorbent in said first adsorption zone with a waste gas stream from said cryogenic distillation process during at least part of the adsorbent regeneration step of said pressure swing adsorption process.

14. The method of claim 12, further comprising purging the adsorbent in said second adsorption zone with a waste gas stream from said cryogenic distillation process during at least part of the adsorbent regeneration step of said temperature swing adsorption process.

15. The method of claim 1 or claim 9, wherein said gas contains hydrogen as an impurity and further comprising between steps (a) and (b) the additional step of contacting the effluent from step (a) with a hydrogen oxidation catalyst, thereby converting said hydrogen to water vapor.

16. The method of claim 1 or claim 9, wherein said gas contains carbon monoxide as an impurity and further comprising between steps (a) and (b) the additional step of contacting the effluent from step (a) with a carbon monoxide oxidation catalyst, thereby converting said carbon monoxide to carbon dioxide.

17. The method of claim 1 or claim 9, wherein said gas contains hydrogen and carbon monoxide as impurities and further comprising between steps (a) and (b) the additional step of contacting the effluent from step (a) with a hydrogen oxidation catalyst and a carbon monoxide catalyst, thereby converting said hydrogen to water vapor and said carbon monoxide to carbon dioxide.

18. The method of claim 9, wherein the pressure in the first adsorption zone during the adsorption step of said PSA process is the range of about 3 to about 20 bara, and the pressure in the first adsorption zone during the adsorbent regeneration step of the PSA process is reduced to a value in the range of about 0.3 to about 2 bara.

19. The method of claim 9, wherein the temperature in the second adsorption zone during the regeneration step of the TSA process is increased to about 100 to about 250° C.

20. The method of claim 1, wherein the activated alumina in said first adsorbent zone reduces the carbon dioxide content of said gas to not more than about 10 ppm.

21. The method of claim 1 or claim 9, wherein said gas contains hydrocarbons as an impurity and further comprising between steps (a) and (b) the additional step of contacting the effluent from step (a) with a hydrocarbon selective adsorbent.

22. The method of claim 1 wherein the adsorbent in said first adsorbent zone is activated alumina or activated alumina/zeolite composite.

* * * * *